July 23, 1929.  R. A. TRACE  1,721,678
CHUCK
Filed March 13, 1926  4 Sheets-Sheet 1
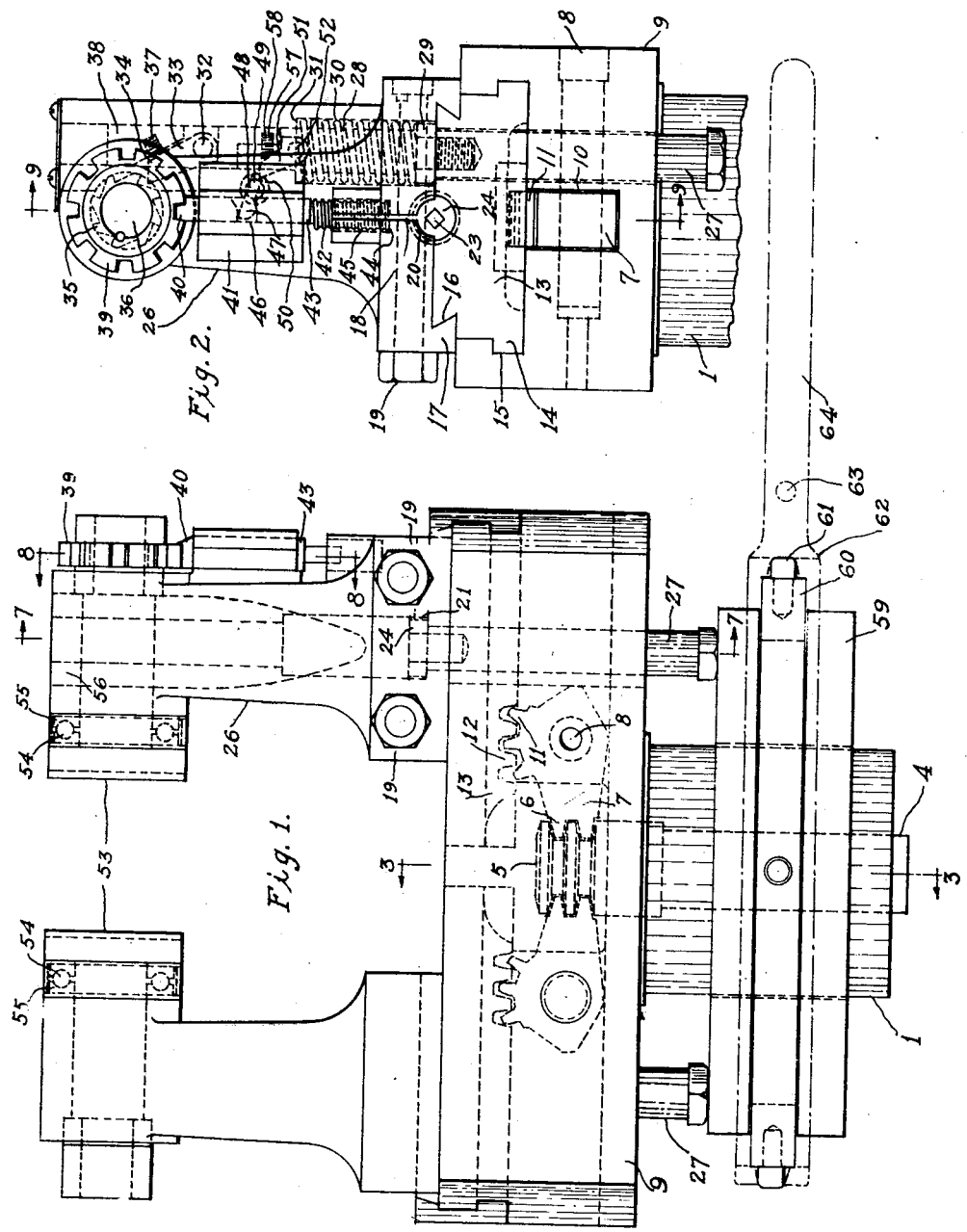
Inventor
RUSSELL A. TRACE
By Toulmin & Toulmin,
Attorneys July 23, 1929.　　　R. A. TRACE　　　1,721,678
CHUCK
Filed March 13, 1926　　　4 Sheets-Sheet 2
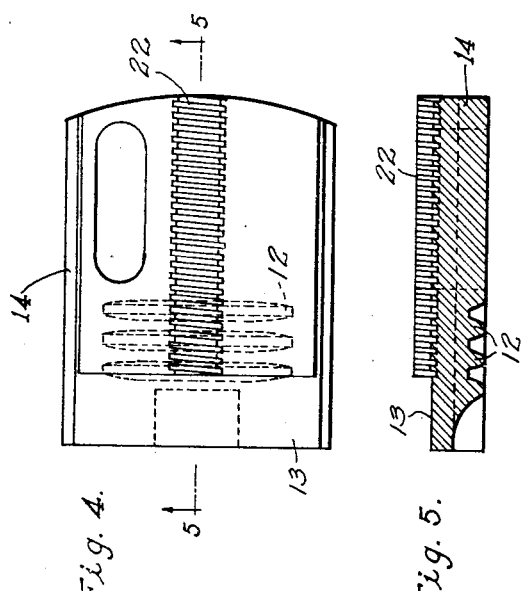
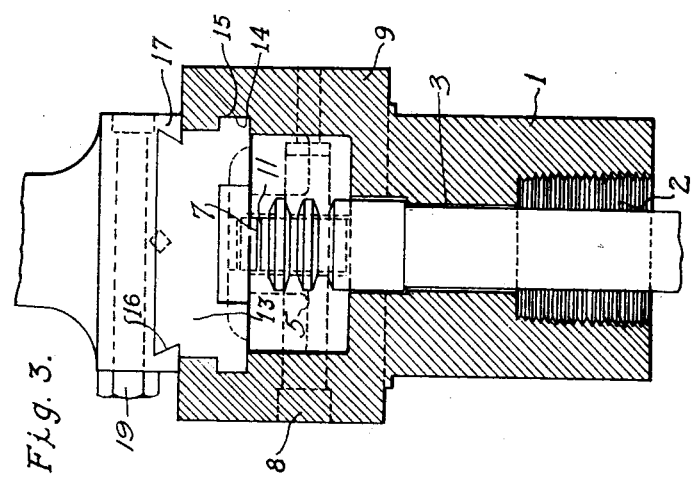
Inventor
RUSSELL A. TRACE
By Toulmin & Toulmin,
Attorneys July 23, 1929.  R. A. TRACE  1,721,678
CHUCK
Filed March 13, 1926  4 Sheets-Sheet 3

Inventor
RUSSELL A. TRACE
By Toulmin & Toulmin,
Attorneys

July 23, 1929.     R. A. TRACE     1,721,678
CHUCK
Filed March 13, 1926     4 Sheets-Sheet 4
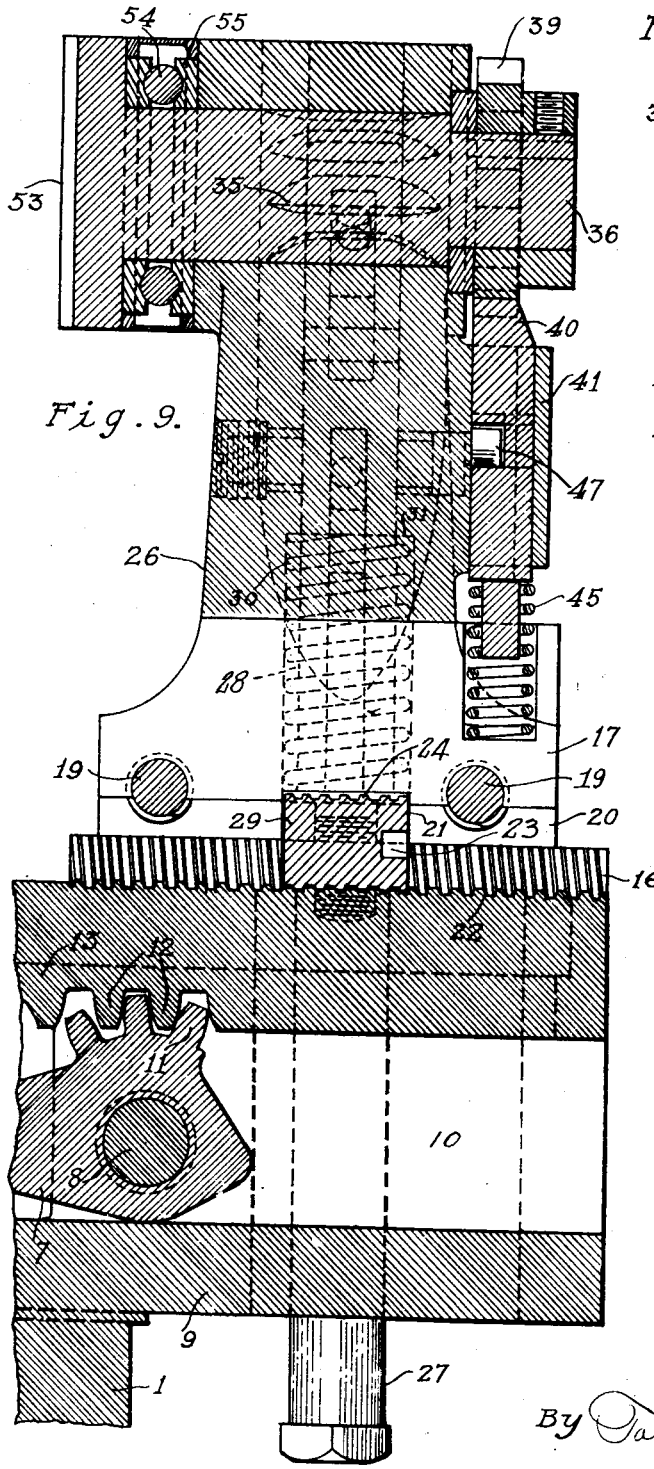
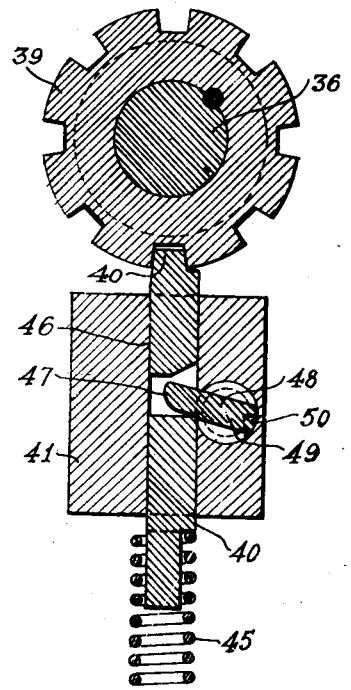
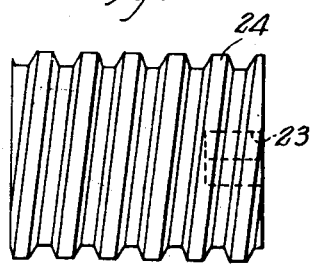
Inventor
RUSSELL A. TRACE
By Toulmin & Toulmin,
Attorneys.

Patented July 23, 1929.

1,721,678

UNITED STATES PATENT OFFICE.

RUSSELL A. TRACE, OF DAYTON, OHIO, ASSIGNOR TO BUCKEYE IRON & BRASS WORKS, OF DAYTON, OHIO, A CORPORATION OF OHIO.

CHUCK.

Application filed March 13, 1926. Serial No. 94,392.

My invention relates to chucks and in particular to an automatic swivel chuck.

The object of my invention is to provide an automatic swivel chuck capable of grasping varying sizes and kinds of work, of rotating the work bodily and of presenting the work in different positions without removing the work from the chuck.

It is a further object of my invention to provide such a chuck which is adjustable to varying sizes of work.

It is a further object to provide means of holding the chuck in engagement with the work until it is necessary to move the work into a new position in the chuck, whereupon the engaging means is unlocked, the work is moved to a new position in the chuck and then the work is re-locked.

It is a further object of this invention to provide means of rotating the work in the chuck and re-setting it without the necessity of stopping the revolution of the chuck on its major axis.

Referring to the drawings:

Figure 1 is a plan view;

Figure 2 is a side elevation;

Figure 3 is a section on the line 3—3 of Figure 1 showing the chuck frame with the parts removed;

Figure 4 is a plan view of one of the chuck blocks;

Figure 5 is a section on the line 5—5 of Figure 4;

Figure 8 is a section on the line 8—8 showing the details of the locking mechanism;

Figure 9 is a section on the line 9—9 of Figure 2;

Fig. 10 is a side view of a short bolt for operating the chuck arm on the rack plate.

Figure 6:
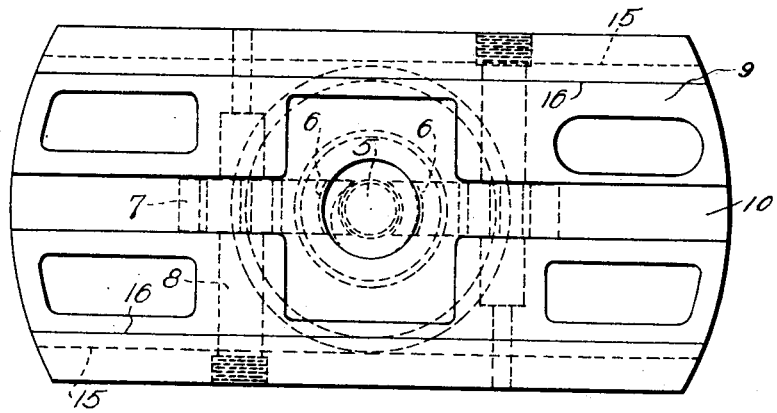
Figure 6 is a front elevation of the chuck block with the chuck jaws removed.
Figure 7:
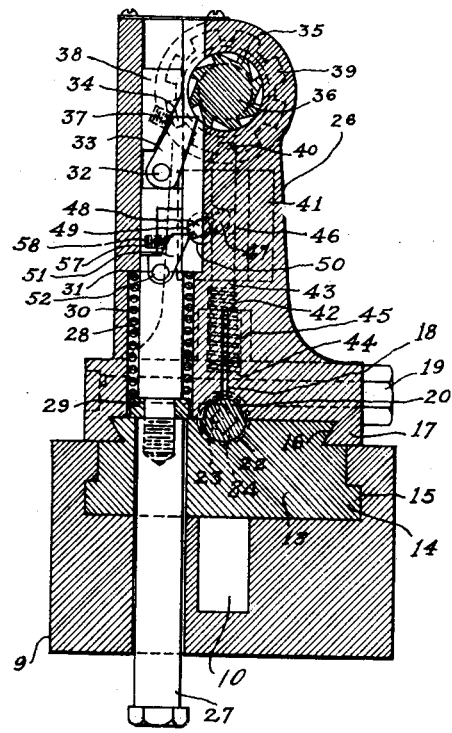
Figure 7 is a section on the line 7—7 of Figure 1, showing the details of the mechanism for revolving the work in the chuck.

Referring to the drawings in detail, 1 is a sleeve threaded at 2 to the lathe head. This sleeve is provided with an internal passageway 3 through which projects the shaft 4, the inner end of which is provided with a threaded head 5 engaging with the teeth 6 of a substantially right angle rack 7 pivoted at 8 in the chuck head 9 and located in a passageway 10 in such head. The teeth 11 are provided on this right angle rack which engage with the teeth 12 of a straight rack or plate 13. There are two of these right angle racks and two of these plates, the teeth 6 of each rack engaging with the worm 5 on the shaft 4. These racks 13 are mounted in the face of the chuck head 9 having shoulders 14 engaging with grooves 15 in the head. This plate 13 carries on its forward face a dove-tail structure 16 which projects beyond the face of the head 9. It carries on its dove tail cooperating dove-tail bases 17 of the individual chuck arms so that the chuck arms are enabled to slide laterally on the dove-tail 16. The bases of the chuck arms are split at 18, such split portions being held together by the bolts 19 so as to clamp the split bases of the chuck arms upon the dove-tail 16. When such parts are released in their clamping action upon the dove-tail they may be individually shifted on the dove tail and upon the reciprocating slide 13 by the following means.

For the purpose of adjusting the chuck arm 17 in relation to the rack plate 13 there is provided the mechanism shown in Figure 9. On the lower face of the chuck arm base there is provided a semicircular groove, indicated by the numeral 20.

Immediately beneath this semicircular groove there is a corresponding semicircular groove, indicated by the numeral 22, which is in the rack plate 13. This semicircular groove in rack plate 13 is threaded, as is clearly shown by this figure.

The upper groove 20 is of the same size as the lower groove, and the two together provide a circular opening through this part of the device. There is provided in the chuck arm base a semicircular cavity, indicated by the numeral 21. This cavity is of the depth of the thread formed on the lower groove, and is adapted to receive the threaded part of the threaded block 24. The threaded block 24 exactly fits within the circular cutaway part 21 in the chuck arm base.

In the screw 24 there is provided a square opening, indicated by the numeral 23, which is adapted to receive an instrument by which the screw 24 can be turned or rotated. As the screw 24 rotates in the threaded groove 22 the chuck arm base 17 is caused to move back and forth on the rack plate. The screw is held against movement in the upper groove by means of the shoulders provided in the circular cut-out part 21, but moves in the lower groove.

When the chuck arm base has been adjusted by the operation of the screw 24, the screws 19 are moved to tighten the dove tails so that this part of the block can not be moved.

Carried at either end of the chuck head 9 are work actuating bolts 27 which are slidably mounted in the chuck head projecting through the slide 13. This bolt travels with the sliding chuck arm and chuck arm base in its lateral movement. The chuck head is sufficiently cut away to permit this lateral adjustment of this work actuating bolt in the chuck head. This work actuating bolt has a second tubular bolt portion 28 attached thereto of lesser diameter than the head 29 on this bolt. This head engages with a helical spring 30 which surrounds the bolt portion 28. The other end of this spring engages with a shoulder 31 in the chuck arm 26 into which the bolt 28 has been projected. This bolt continues through a cutaway portion and the chuck arm to a point where there is pivoted thereto at 32 a pawl 33 which is adapted to have its nose 34 engage with a ratchet 35 on the work supporting shaft 36 to rotate the shaft. This pawl is projected upwardly above the bolt into the teeth of the ratchet 35 by the helical spring 37, one end of which engages with the end of the pawl 34 and the other end of which is mounted in a block 38. The end of the shaft 36 carries a locking rack having teeth 39 between which a locking plunger 40 engages, such plunger being carried in a bracket 41, the plunger being normally actuated forwardly by a helical spring 42 mounted thereon against a shoulder 43 at one end on the bolt 40 and against a shoulder 44 of the chuck arm base within an aperture 45 in which the spring is mounted. This bolt is provided with a transverse cutaway portion 46 into which is projected a nose 47 of an actuating finger 48 pivoted at 49 in the chuck arm and having its lower end provided with a shoulder 50 adapted to be engaged by a pawl 51 which is pivoted at 52 on the bolt 28 so that as the bolt moves forwardly the locking plunger will be withdrawn thereby unlocking the shaft 36 and permitting it to be rotated by the advance pawl 33 having its head 34 engaging with the teeth of the rack 35. As this shaft carries the work in a jaw 53, the work is rotated to a new position. The crushing strains of the chuck arms engaging through the jaws 53 a piece of work therebetween are taken by the ball bearings 54 interposed between the heads 53 and the side surface 55 of the chuck arm head 56.

Thus, this invention comprises a rotating head having arms which are adjustable laterally for engaging or disengaging work which, upon the engagement with the work, will remain in such engaged position and are locked in such position until the supports are unlocked and are rotated while still engaging the work, after which they are re-locked. Thus, the work is revolved about the major axis of the chuck and may be revolved about the minor axis running through the ends of the chuck arms at right angles thereto.

It will be noted that the pawl 51 is constantly thrust upwardly by the spring 57 which is seated at 58 in the bolt 28.

The work actuating bolts are moved by a collar 59 which is provided with a groove 60 in which are mounted the arm 61 of the fork having a shaft 62 pivoted at 63 and provided with a handle 64 so that the bolts can be simultaneously moved to unlock the work and rotate the work and then restore it to their original position relocking the work as desired without stopping the machine. One of the important features of this invention is to re-set the work in the jaws of the chuck without stopping the machine for such re-setting operation.

The shaft 4 may be operated by any desired means. Such means may take the form of a pneumatic or hydraulic cylinder of which the rod 4 may be the piston rod and in which is located a piston mounted thereon, so that the rod 4 may be reciprocated as desired by the operator when moving from one position to the other, and may be held in such position.

It is essential that the rod is so held while the chuck head and racks revolve around it, the teeth 6 traveling between the shoulders of the thread 5.

It will be understood that I desire to comprehend within my invention such modifications as may be necessary to adapt it to varying conditions and uses.

Having thus fully described my invention, what I claim as new and desire to secure by Letters Patent, is:—

1. In combination, a chuck head, a supporting slide, means to move said slide relative to said head, a chuck arm and chuck arm base mounted on said slide and means to adjust the relative position of said chuck arm and chuck arm base on said slide, a rotatable head on said arm and means to rotate said head without stopping the chuck.

2. In combination, a chuck head, a supporting slide, means to move said slide relative to said head, a chuck arm and chuck arm base mounted on said slide and means to adjust the relative position of said chuck arm and chuck arm base on said slide, said means consisting of a semi-circular threaded portion in the slide and a cutaway portion in the chuck arm base communicating with an adjacent semi-circular cutaway portion opposite the first mentioned semi-circular cutaway portion and a screw plug mounted in the first semi-circular cutaway portion and in the main cutaway portion in the chuck base, a rotatable head on said arm and means to rotate said head while said chuck is rotating.

3. In combination, a chuck head, a reciprocating slide, means on said chuck head for moving said slide on said head, means to rotate said chuck head, means of adjusting the slide and maintaining it in adjusted position, a chuck arm base mounted on said slide adapted to move thereon, a chuck arm mounted on said base, clamping means on said base for clamping said base on the slide and a screw plug working in the face of said slide and engaging within said chuck arm base adapted to independently position said chuck arm base on said slide.

4. In combination in a chuck, a pair of chuck bases, chuck arms mounted thereon, means to laterally adjust the relative position of the arms on the bases without stopping the rotation of the chuck, rotatable work supports on said arms, means to rotate said supports and the work carried thereby without stopping said chuck, means to adjustably position said arms with respect to the means adapted to move them laterally on said chuck whereby said chuck arms may be adjusted relative to one another and the chuck by their adjusting means, may be adjusted relative to their own adjusting means and the work carried by them may be adjusted rotatably with respect to the arms.

In testimony whereof, I affix my signature.

RUSSELL A. TRACE.